United States Patent

Broux et al.

[11] Patent Number: 6,154,634
[45] Date of Patent: Nov. 28, 2000

[54] COMMUNICATIONS SYSTEM INCLUDING CLOSELY SPACED TRANSMIT AND RECEIVE ANTENNAS

[75] Inventors: Denis Broux; Nadia Dezelak, both of Paris; Jean Broyer, Pomponne; Andre Marguinaud, Palaiseau, all of France

[73] Assignee: Alcatel, Paris, France

[21] Appl. No.: 09/172,855

[22] Filed: Oct. 15, 1998

[30] Foreign Application Priority Data

Oct. 16, 1997 [FR] France .................................. 97 12986

[51] Int. Cl.7 ...................................................... H04B 1/17
[52] U.S. Cl. ................................................. 455/24; 455/63
[58] Field of Search ................................ 455/75, 63, 78, 455/80, 82, 88, 552, 562, 401, 296, 302, 295, 553, 83, 24, 234.1, 126, 232.1, 278.1, 25, 279.1, 114

[56] References Cited

U.S. PATENT DOCUMENTS 4,952,193   8/1990   Talwar .
5,049,832   9/1991   Cavers .

Primary Examiner—Nguyen Vo
Assistant Examiner—N. Mehrpour
Attorney, Agent, or Firm—Sughrue, Mion, Zinn, Macpeak & Seas, PLLC

[57] ABSTRACT

The invention concerns a communications system including at least one transmit antenna near at least one receive antenna, transmission producing signals in the receive frequency band. The system includes a transmit neutralizing circuit for supplying a correction signal for eliminating only interfering signals whose frequency is in the receive signal frequency band. The transmit neutralizing circuit is on the input side of an amplifier and comprises means for evaluating, in the wanted receive frequency band, a limited number of parameters of the power amplifier feeding the transmit antenna, this evaluation of parameters being effected on the basis of the input and output signals of the amplifier. The circuit also evaluates the signals causing the interference prior to the input of the amplifier; this evaluation of the interfering signals is based on the calculated parameters and the signal at the input of the amplifier. Application to transmission systems on ships or spacecraft.

11 Claims, 1 Drawing Sheet

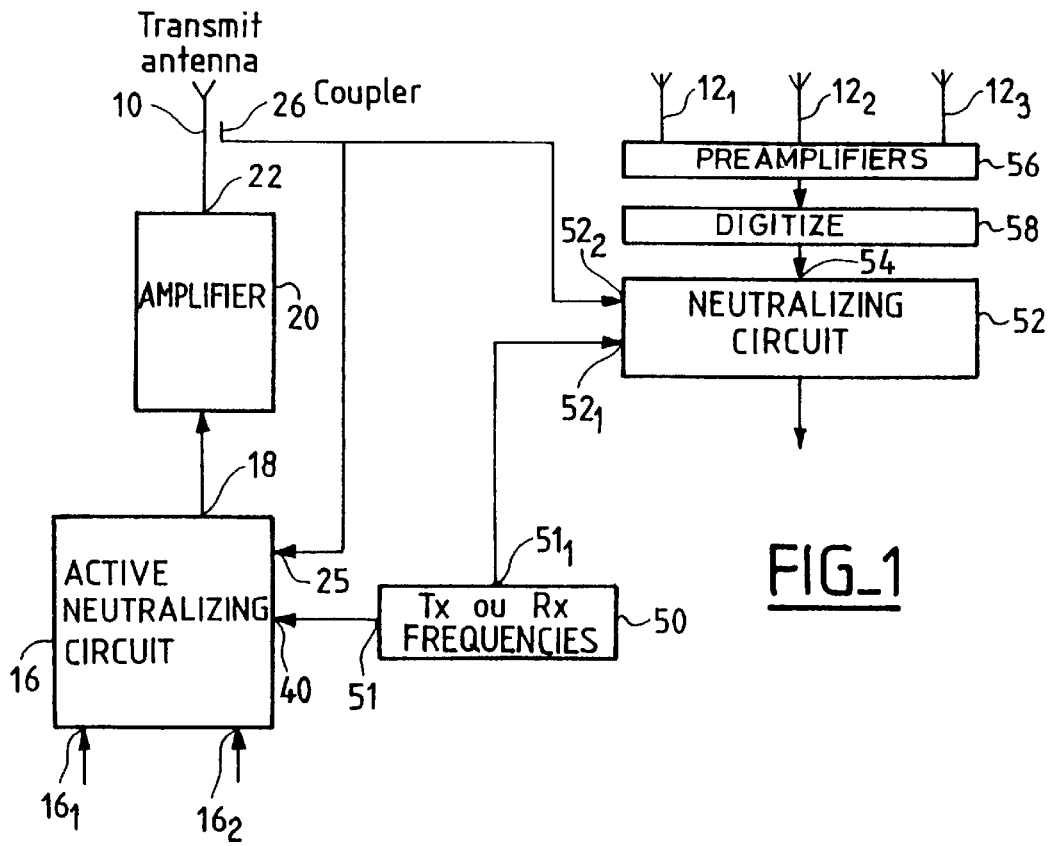
FIG_1
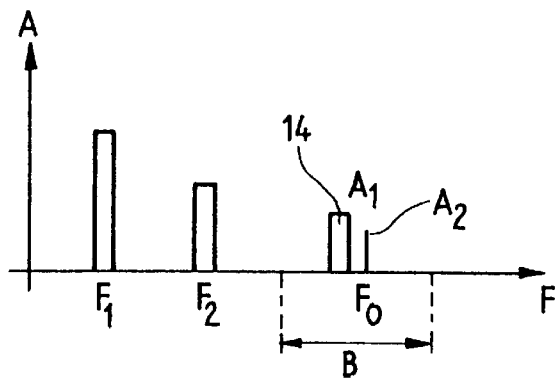
FIG_2
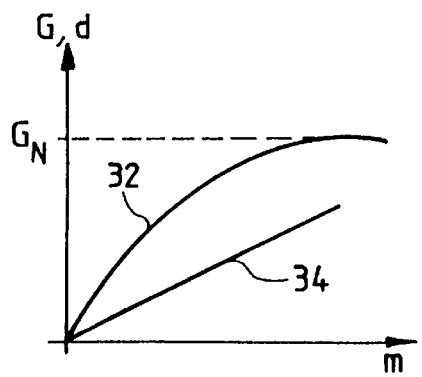
FIG_3

COMMUNICATIONS SYSTEM INCLUDING CLOSELY SPACED TRANSMIT AND RECEIVE ANTENNAS

The present invention concerns a telecommunications system using antennas in which at least one transmit antenna and at least one receive antenna are close to each other.

BACKGROUND OF THE INVENTION

Transmit and receive antennas are often close to each other on ships, satellites, and spacecraft, for example. Precautions must therefore be taken to prevent the transmitted signals interfering with the receive channel. The transmit frequency bands are generally separate from the receive frequency bands. However, this separation is not always sufficient because interfering signals often occur outside the transmit band.

The interfering signals include signals resulting from the combination of signals from two or more transmissions on different carrier frequencies. As the combination is algebraic, it produces interfering signals at frequencies in the transmit bands and in the receive bands.

Accordingly, when two signals centred on frequencies $F_1$ and $F_2$ pass through the same amplifier, unwanted signals are generated centred on the frequencies $F_1-F_2$, $F_1+F_2$, $2F_1+F_2$, etc.

The interfering signals can also comprise harmonics of a monotone (single frequency) signal.

The interfering signals originate in non-linearities of the transmission system, in particular in the amplifiers. The fact that it is difficult to decouple the transmit antennas from the receive antennas makes them more of a problem.

Various solutions have been proposed to the problem of eliminating intermodulation signals in multitone (i.e. multifrequency) broadband transmissions. Those solutions usually consist in modifying the signals to be transmitted to correct the non-linear element.

Prior art methods do not provide a satisfactory solution.

OBJECTS AND SUMMARY OF THE INVENTION

The system in accordance with the invention provides reception subject to minimal interference from signals transmitted in the near vicinity.

The system comprises neutralizing means in the transmitter, and possibly in the receiver, adapted to eliminate only interfering signals with frequencies in the wanted receive band. Since the operation of the neutralizing means is limited to the receive bands, its processing means, in particular its calculation means, can be utilised maximally for the required purpose.

The expression "neutralizing" is to be understood as meaning that the transmit amplifiers, and the receivers if necessary, are fed with signals for eliminating only those interfering signals which impede reception.

In the transmitter the neutralizing means comprise: means for evaluating a limited number of power amplifier parameters in the wanted frequency band, this evaluation being based on the input and output signals of the amplifier, means for evaluating signals causing interference upstream of the input of the amplifier, this evaluation being effected on the basis of the calculated parameters and the signal from the input amplifier, and means for subtracting from the input signal of the amplifier the signal generating interference impeding reception.

The synthesized interfering signal is in antiphase with the real interfering signal, for example.

The invention stems from the observation that the level of the troublesome interfering signal (in the friend receive bands and near the friend transmitter) is low compared with the level of the main transmit signal. Under these conditions, the instantaneous complex gain of the power amplifier is not modified by the correction signal.

Note that the means for calculating or evaluating parameters of the amplifier and the means for evaluating the signals generating interference do not operate like a feedback loop. It has been found that the neutralizing means can operate in an open loop configuration, because the characteristics of the power amplifier change slowly.

In other words, in a preferred embodiment of the invention, a model of the amplifier is established and this model is used to eliminate the interfering signals in each receive band.

When analytical signals are used, the model of the amplifier can be established entirely on the basis of the modulus of the analytical signal to be amplified because the effect of a real amplifier is a real gain and a phase-shift that are dependent only on the modulus of the analytical signal to be amplified. This makes the calculation relatively simple and reduces the amount of memory needed, given the individual bandwidths. As shown below, the correction signal is a weighted sum of simple functions of the individual transmitted signals or of their products.

The model of the amplifier is simple because the interfering signals are eliminated only for the band of frequencies to be received. It has been found that in practice it is sufficient to determine three or four parameters of the amplifier for each band processed by the neutralizing means. In one embodiment these parameters are the phase-shift of the gain and its nominal modulus, possibly with a parameter related to the curvature or to the slope of the curve of this gain as a function of the modulus of the input signal.

The above processing is applied to the analytical nonlinearities and to the instantaneous non-linearities. In an analytical non-linearity the complex gain depends on the modulus of the analytical representation of the real signal to be amplified and in an instantaneous non-linearity the real gain depends on the instantaneous amplitude of the real signal to be amplified.

The model of the amplifier is based on the analytical representation of the signal to be amplified.

In the case of neutralizing processing being performed in the receiver, i.e. passive neutralizing processing which complements the active neutralizing processing, the interfering signals collected at the transmit antenna are measured. In contrast, the interfering signal is subtracted from the signal received with a complex gain.

If analytical signals are used, a gain which is independent of the analytical modulus of the signal to be received is applied to the interfering signal to be subtracted. The complex gain depends on the degree of correlation between the measured interfering signal and the received signal. It is therefore determined by means of a correlation between the received signal and the measured interfering signal, for example. The estimate obtained is then preferably applied at a time that is substantially in the centre of the estimation time period in order to allow for drift, for example.

Analytical processing of sampled signals exploits the fact that the signals concerned are in a limited frequency band, namely the received band.

The digital processing is based, firstly, on the fact that any real signal can be represented by complex samples evolving at the timing rate B where B is the frequency band in which the real signal is located and, secondly, on the fact that, within a finite time period, the signal can be represented with uniform accuracy by means of a finite sum of sinusoids each of which has a frequency in the frequency band B. To obtain the complex signal associated with a real signal from frequency band B and with centre frequency F it is sufficient to effect temporal sampling with an increment $\Delta t$ such that:

$$F\Delta t = \frac{\pm \Pi}{2}(modulo\ 2K\Pi) \pm \varepsilon$$

In the above formula, $\varepsilon$ is the required accuracy, for example 30%.

Each component (x and y) in quadrature associated with a series of real samples of a signal is evaluated by means of a linear function of those samples. The function is symmetrical for the component x and antisymmetrical for the component y.

To determine the appropriate sampling frequency to obtain good quadrature there are in theory two conditions to be complied with:

the first condition is that the real sampling frequency must be greater than approximately ten times the greatest bandwidth of the various signals. This means that all the calculations can be done with the same real sampler.

the second condition is that the real sampling frequency must satisfy the quadrature condition of all the signals considered; this condition is expressed by the following equation:

$$\frac{2\Pi f}{f_e} = \frac{\pm \Pi}{2}(1+\alpha) + 2K\Pi;$$

In the above formula, f is the frequency of a signal to be sampled and fe is the sampling frequency, the parameter $\alpha$ having a value of approximately ±20%; this latter parameter determines the complexity, i.e. the number of coefficients, of the calculation of the components x and y.

Analytical sampling of a signal obtains calculations of sufficient accuracy quickly.

For details of analytical sampling, reference may be had to French Patent No. 2 707 119 entitled "Procede de calculs de coefficients de ponderation pour un numeriseur analytique pour traitement de signal, et numeriseur analytique" ("Method calculating weighting coefficients for an analytical digitizer for signal processing and analytical digitizer") filed Jul. 1, 1993.

BRIEF DESCRIPTION OF THE DRAWING

Other features and advantages of the invention will become apparent from the description of some of its embodiments given with reference to the accompanying drawing, in which:

FIG. 1 is a block diagram of a system in accordance with the invention, and

FIGS. 2 and 3 are diagrams explaining the operation of the system from FIG. 1.

MORE DETAILED DESCRIPTION

The embodiment of the invention to be described with reference to the figures is a shipboard transmission system which includes a transmit antenna 10 and three receive antennas $12_1$, $12_2$ and $12_3$.

The frequencies of the signals transmitted by the antenna 10 are separate from the frequencies of the signals to be received by the antennas $12_1$ through $12_3$.

In the FIG. 2 diagram the frequency F is plotted on the horizontal axis and the signal amplitude is plotted on the vertical axis. This diagram shows that the signals are transmitted at frequencies $F_1$ and $F_2$ which are outside the band B of receive frequencies.

However, intermodulation of signals at different frequencies $F_1$ and $F_2$ transmitted by the same antenna 10 or by different antennas produces signals at frequencies that can fall within the band B. Accordingly, a band 14 resulting from linear combination of the frequencies $F_1$ and $F_2$ is shown, this band 14 being within the receive band B. The band 14 has an amplitude $A_1$ greater than the amplitude $A_2$ of the signal to be received.

It is therefore essential to eliminate the intermodulation noise 14. It is also necessary to eliminate transmit harmonics in the receive band.

This is the purpose of the system represented in FIG. 1, which eliminates any interfering signals in the receive band.

In the installation represented in FIG. 1, there is an active neutralizing circuit 16, i.e. one which eliminates the interfering signals before transmission from the antenna 10, together with a passive neutralizing circuit. The passive neutralizing circuit complements the effect of the active neutralizing circuit.

In this example, the transmit antenna 10 receives two wanted signals together with the neutralizing signal. These signals pass through an amplifier 20 whose output is connected to the antenna 10. Thus a single amplifier is provided for transmitting two (or more) wanted signals. Moreover, it should be noted at this point that the installation does not correct the parameters of the amplifier but enables the transmission of a neutralizing signal, this signal being transmitted in the same manner as the wanted signals.

The circuit 16 therefore has inputs $16_1$ and $16_2$ for the wanted signals to be passed to the antenna 10 via the amplifier 20. The output 18 of the circuit 16 is connected to the input of the amplifier 20.

The signals delivered to the output 18 are processed so that the antenna 10 transmits signals that do not interfere with reception.

The interference results primarily from non-linearities of the amplifier 20.

The circuit 16 synthesizes signals to be applied to the amplifier 20 and also synthesizes and subtracts interfering signals. Finally, the circuit 16 calculates the parameters of the amplifier 18 in the receive band that contribute to interference.

On the basis of the above parameters, the circuit 16 calculates the interference signal in the receive frequency band and applies the signal representing the interference in antiphase to the signals applied to the inputs $16_1$ and $16_2$.

For measuring parameters of the amplifier, the circuit 16 has an input 25 receiving a signal representing output signal of the amplifier 20. To this end a coupler 26 is provided for diverting a signal from the antenna 10 to the input 25.

There are three amplifier parameters in this example. They are the nominal gain $G_N$ of the amplifier (FIG. 3), a parameter representing the curve 32 of the gain as a function of modulus of the input signal of the amplifier and a parameter representing the phase-shift. In the example, as shown in the FIG. 3 diagram, the phase-shift d varies in a practically linear fashion with the modulus m of the input signal as shown by the straight line 34. Under these conditions, the parameter representing the phase-shift is the slope of the straight line 34 in this example.

The parameter representing the curve 32 of the gain as a function of the input modulus is the radius of curvature of the part of the curve 32 between the origin O and the nominal value $G_N$, for example.

Give that, for calculating the interference, it is essential to know the receive frequencies and also the transmit frequencies, the circuit 16 is connected to the outputs of a circuit 50 delivering signals representing the transmit and receive frequencies. The circuit 50 has a first output 51 connected to an input 40 of the circuit 16.

The circuit 16 receives via the input 25 information on the frequencies that the antenna 10 is transmitting.

The parameters of the amplifiers are calculated in real time in the circuit 16. They constitute a representation, or model, of the amplifier causing the interference and from these parameters, and therefore from the model of the amplifier, the circuit 16 calculates the interference contributed by the amplifier in the receive mode concerned, in order to produce the correcting signals.

Note that this neutralizing effect is different from conventional feedback which could introduce signal time-delays.

It is true that in the present situation the parameters of the amplifier are calculated at a time earlier than the time at which the correction is applied. However, this time shift is of no consequence because the parameters of the amplifier change slowly.

As indicated hereinabove, the analytical sampling method is preferably used to carry out the calculation. For such analytical sampling, apart from the conditions mentioned above with regard to the frequencies, precautions must be taken so that the time reference is the same for all the signals. It is therefore advantageous to use a sampler common to the signals.

Calculation principles are described hereinafter enabling the parameters of the amplifier and the correction signal to be determined.

The calculation is based on the fact that the output signal s(t) of an amplifier is related to the input signal e(t) by the following linear equation:

$$s(t)=g[r^2(t)]e(t) \quad (1)$$

In the above equation:

$$r^2(t)=e(t)e^*(t) \quad (2)$$

$e^*(t)$ signifies the complex conjugate of $e(t)$.

Also, the function $g[r^2(t)]$ is a complex gain that can be represented in the form of a second degree polynomial in $r^2$:

$$g(r^2)=G[1+ar^2+br^4] \quad (3)$$

In the above equation, a and b are complex coefficients that can be determined by approximation (empirically) in various ways. One way is to determine the real gain or the phase-shift on the basis of the input signal modulus and to seek a uniform approximation in the wanted range of the modulus or an approximation that allows for the histogram of the modulus of the incoming signal. Another method consists in evaluating the three complex coefficients from real samples by minimizing an appropriately chosen quadratic shape.

The manner in which the amplifier interferes with the wanted signals in their frequency bands and the unwanted signals created outside of the wanted bands can be determined from equations (1) and (3) above. To this end the Fourier transform S(f) of the signal s(t) is calculated. This Fourier transform is the product of convolution of Fourier transforms of the functions $g[r^2(t)]$ and $e(t)$ from equation (1) if the standard Dirichlet conditions are satisfied.

To determine the Fourier transform of s(t), it is primarily necessary to determine the Fourier transform of $r^2(t)$.

Consider first the situation in which the amplifier transmits a limited bandwidth signal, i.e. a signal with centre angular frequency $\omega_1$ and bandwidth $\Delta\omega_1/2\pi$.

In this case, it can be shown that the Fourier transform $R(\omega)$ of $r^2(t)$ can be written:

$$R(\omega) = \frac{1}{\sqrt{2\pi}} \int_{-\infty}^{+\infty} E(\gamma)E^*(\gamma - \omega) d\gamma \quad (4)$$

In the above equation, $E(\gamma)$ is the Fourier transform of the signal e(t).

It can be seen that with equation (4), the Fourier transform of the real function $r^2(t)$ satisfies the following equation:

$$R(\omega)=R^*(-\omega) \quad (5)$$

This transform is therefore centred on the zero angular frequency and has a total range $\Delta\omega_1/\pi$, i.e. it has a bandwidth twice that of $E(\omega)$.

It can also be shown that the Fourier transform of $r^4(t)$ is centred on the zero frequency and occupies a bandwidth $3\Delta\omega_1/\pi$, i.e. 6 times the bandwidth of $E(\omega)$.

The signal E(t) can generally be considered as made up of a plurality of spaced narrowband signals. In other words, the input signal e(t) can be represented by the following equation:

$$e(t) = \sum_i e_i(t) \quad (6)$$

The angular frequency of each signal $e_i(t)$ is $\omega_i$ and its bandwidth is $\Delta\omega_i/2=\Delta f_i$.

Under these conditions, the signals ($r^2$) and s(t) from equations (1) and (3) can be written:

$$\begin{cases} g(r^2) = G\left[1 + a\left|\sum_i e_i(t)\right|^2 + b\left|\sum_i e_i(t)\right|^4\right] \\ s(t) = g(r^2)\sum_i e_i(t) \end{cases} \quad (7)$$

Consider by way of example a situation in which the signal e(t) is the sum of three signals $e_1(t)$, $e_2(t)$ and $e_3(t)$ centred on positive frequencies $F_1$, $F_2$ and $F_3$.

Under these conditions, ignoring a constant factor, the transmitted signal has the following form:

$$s(t) \, e(t)[1+ae(t)e^*(t)], \quad (8)$$

i.e.:

$$s(t) \, [e_1(t)+e_2(t)+e_3(t)][1+a(e_1(t)+e_2(t)+e_3(t))(e_1^*(t)+e_2^*(t)+e_3^*(t))]$$

The above equations show that the spectrum occupied includes sub-bands with the following centre frequencies:

$F_1, F_2, F_3, |2F_1-F_2|, |2F_2-F_3|, |2F_3-F_1|, |2F_1-F_3|,$ $|, |2F_2-F_1|, |2F_3-F_2|, |F_2+F_3-F_1|, |F_1+F_3-F_2|, |F_1+F_2-F_3|. \quad (9)$ The signal with centre frequency $F_1$ corresponds to the expression:

$$e_1(t)[1+a(e_1(t)e_1^*(t)+2e_2(t)e_2^*(t)+2e_3(t)e_3^*(t))]; \quad (10)$$

that with frequency $2F_1-F_2$ corresponds to:

$$ae_1^2(t)e_{2^*}(t); \quad (11)$$

that with centre frequency $F_2+F_3-F_1$ corresponds to:

$$2ae_2(t)e_3(t)e_1^*(t) \quad (12)$$

The signals corresponding to the centre frequencies (9) above correspond to a strictly analytical model.

Nevertheless, it is also necessary to take account of instantaneous non-linearities that generate intermodulation products at frequencies $2F_1$, $F_1+F_2$, etc.

Analysis of the instantaneous non-linearities can be based on the fact that the output signal has the following form:

$$e(t)+e^*(t)+\alpha[e(t)+e^*(t)]^2+\beta[e(t)+e^*(t)]^3+\ldots \quad (13)$$

It can be shown that a combination of the analytical model and the above model of instantaneous non-linearities limited to the first term of the expansion can be written:

$$s(t)=G[e(t)+\alpha e^*(t)+\beta(e(t)+e^*(t))^2+ae^2(t)e^*(t)]. \quad (14)$$

The model uses four complex parameters G, $\alpha$, $\beta$ and a. It shows the existence of sub-bands centred on $2F_1$, $2F_2$, $2F_3$, $F_1+F_2$, $F_2+F_3$, $F_1+F_3$, $|F_1-F_2|$, $|F_2-F_3|$ and $|F_1-F_3|$.

In general, the moduli of the parameters $\alpha$, $\beta$ and a are small in relation to unity, for example less than 0.2.

These parameters enable the interfering signals to be determined using the above equation (14).

The parameters can be determined by measuring the interfering signals. For example, the interfering signal at frequency $F_1+F_2$ is represented by $2G\beta e_1(t)e_2(t)$. The parameter $2G\beta$ is estimated from a measured interfering signal $P(F_1+F_2,t)$ which satisfies the following equation:

$$P(F_1+F_2,t)\approx 2G\beta e_1(t)e_2(t). \quad (15)$$

Accordingly, the parameter $2G\beta$ can be determined from the following equation:

$$2\overline{G\beta} = \frac{\sum_t P(F_1+F_2,t)e_1^*(t)e_2^*(t)}{\sum_t |e_1(t)e_2(t)|^2} \quad (16)$$

In equation (16), the integrals in t correspond to complex sampling at a timing rate equal to the bandwidth of the signal $e_1(t)e_2(t)$.

To eliminate the interfering signal, we subtract from e(t) the interfering signal estimated at the frequency $F_1+F_2$ by the equation:

$$P(F_1+F_2,t)=2G\beta e_1(t)e_2(t) \quad (17)$$

In the above example with three transmit frequencies $F_1$, $F_2$ and $F_3$, the interfering signal at the frequency $F_1$ is, allowing for equation (14) above:

$$P(F_1,t)=G[\alpha e_1^*(t)+ae_1(t)(e_1(t)e_1^*(t)+2e_2(t)e_2^*(t)+2e_3(t)e_3^*(t))] \quad (18)$$

The following system of two equations can be solved to determine the parameters $\alpha$ and a:

$$\begin{cases} \sum_t P(F_1,t)e_1(t) = \sum_t e_1^2(t) + \alpha \sum_t e_1(t)e^*(t) + a\sum_t e_1^2(t)[|e_1(t)|^2+|e_2(t)|^2+|e_3(t)|^2] \\ \sum_t P(F_1,t)e_1^*(t) = \sum_t |e_1(t)|^2 + \alpha \sum_t e_1^2(t) + a\sum_t |e_1(t)|^2[|e_1(t)|^2+|e_2(t)|^2+|e_3(t)|^2] \end{cases} \quad (19)$$

For the active neutralizing effect, the signal $\epsilon_1$ for correcting a signal $F_1$, is given by the following expression:

$$-\epsilon_1(t)=G[\alpha e_1^*(t)+a(|e_1(t)|^2+|e_2(t)|^2+|e_3(t)|^2)] \quad (20)$$

The other corrections are deduced in a similar manner from the above considerations, in particular from equation (14).

Note that the correction signals can generate new interfering signals but in practice the level of such new interfering signals is negligible.

For the passive neutralizing effect, i.e. the elimination of interference in the received circuit, the circuit 50 supplies information concerning the transmit frequencies and the receive frequencies to a neutralizing circuit 52. This information is applied to an input 52$_1$. The circuit 52 also has an input 52$_2$ receiving a signal representing the signal applied to the antenna 10 and a main input 54 connected to the receive antenna 12₁, 12₂, 12₃ via preamplifiers 56 and a digitizer 58.

The circuit 52 includes calculating means for eliminating the interference signals. Such elimination allows for the transmit signal 52₁, the transmit and receive frequencies and the measured transmit signal.

What is claimed is:

1. A communications system including at least one transmit antenna near at least one receive antenna, transmission producing signals in the receive frequency band, the system further including a transmit neutralizing circuit adapted to supply a correction signal for eliminating only interfering signals whose frequency is in the receive signal frequency band.

2. A system according to claim 1, wherein the transmit neutralizing circuit is on the input side of an amplifier.

3. A system according to claim 2, wherein the neutralizing circuit includes means for evaluating:

in the wanted receive frequency band a limited number of parameters of the power amplifier feeding the transmit antenna, this evaluation of parameters being based on input and output signals of said amplifier, the signals causing the interference prior to the input of the amplifier, this evaluation of the interfering signals being based on the calculated parameters and the signal at the input of the amplifier, the neutralizing circuit subtracting from the input signal of the amplifier the signal generating interference evaluated in this way.

4. A system according to claim 3, wherein the elimination of the interfering signals is effected in an open loop configuration.

5. A system according to claim 1, wherein the neutralizing circuit employs processing using analytical sampling.

6. A system according to claim 5, wherein the neutralizing circuit includes a sampler common to the signals to be transmitted so that the latter have the same time reference.

7. A system according to claim 3, wherein the means for evaluating a limited number of parameters of the amplifier are based on the fact that the gain $g(r^2)$ of the amplifier can be represented in the form of a second degree polynomial in $r^2$, with:

$$r^2(t)=e(t)e^*(t),$$

$e(t)$ being the complex representation of the signal at the input of the amplifier and $e^*(t)$ being its complex conjugate.

8. A system according to claim 7, wherein the second degree polynomial in $r^2$ is of the form:

$$g(r^2)=G[1+ar^2+br^4],$$

the values G, a and b being complex coefficients.

9. A system according to claim 2, wherein the neutralizing circuit comprises means for establishing a model of the amplifier and means using said model to eliminate the interfering frequencies in each receive band.

10. A system according to claim 9, wherein the neutralizing circuit employs processing using analytical sampling and the model of the amplifier is established from the analytical representation of the signal to be amplified.

11. A system according to claim 1, further comprising neutralizing means in the receiver employing a measurement of interfering signals collected at the transmit antenna, the interfering signal being subtracted from the received signal with a complex gain.

* * * * *